United States Patent
Han et al.

(10) Patent No.: US 10,346,240 B2
(45) Date of Patent: Jul. 9, 2019

(54) REPAIR INFORMATION PROVIDING DEVICE IN AN INTEGRATED CIRCUIT

(71) Applicant: SAMSUNG ELECTRONICS CO., LTD., Suwon-si (KR)

(72) Inventors: Ju-Hee Han, Gunpo-si (KR); Yo-Seop Lim, Anyang-si (KR); Dong-Kwan Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 330 days.

(21) Appl. No.: 15/095,245

(22) Filed: Apr. 11, 2016

(65) Prior Publication Data
US 2017/0024273 A1    Jan. 26, 2017

(30) Foreign Application Priority Data
Jul. 23, 2015   (KR) ..................... 10-2015-0104097

(51) Int. Cl.
*G06F 11/07*  (2006.01)
(52) U.S. Cl.
CPC ........ *G06F 11/0793* (2013.01); *G06F 11/073* (2013.01)
(58) Field of Classification Search
CPC .. G06F 11/0793; G06F 11/079; G06F 11/073; G11C 2029/4402; G11C 29/44
See application file for complete search history.

(56) References Cited

U.S. PATENT DOCUMENTS

| 4,707,842 A * | 11/1987 | Fischer | G11B 20/1403 |
| | | | 327/144 |
| 6,795,942 B1 * | 9/2004 | Schwarz | G11C 29/44 |
| | | | 714/711 |
| 7,782,687 B2 | 8/2010 | Kurozumi | |
| 7,908,527 B2 * | 3/2011 | Kohara | G11C 29/848 |
| | | | 365/201 |
| 8,238,172 B2 | 8/2012 | Takagiwa | |
| 8,270,237 B2 | 9/2012 | Kubouchi | |
| 8,325,548 B2 | 12/2012 | Matsuo | |

(Continued)

FOREIGN PATENT DOCUMENTS

JP    4364200 B2    11/2009
JP    2013-122800 A    6/2013

*Primary Examiner* — Yolanda L Wilson
(74) *Attorney, Agent, or Firm* — Sughrue Mion, PLLC

(57) ABSTRACT

A repair information providing device in an integrated circuit including a plurality of memory blocks includes a plurality of faulty cell address registers connected to the memory blocks, respectively, a repair information storage block configured to store repair information including an address of a faulty cell and a memory index indicating a memory block having the faulty cell, a repair information control block configured to read the repair information from the repair information storage block, transfer the address of the faulty cell included in the repair information to the respective faulty cell address registers, and generate a memory block selection signal based on the memory index included in the repair information, and a clock gating block configured to receive a clock signal, and selectively transfer the clock signal to one of the faulty cell address registers connected to the memory block having the faulty cell in response to receiving the memory block selection signal.

17 Claims, 9 Drawing Sheets

(56) References Cited

U.S. PATENT DOCUMENTS

| | | |
|---|---|---|
| 8,339,880 B2 | 12/2012 | Koo |
| 8,644,097 B2 | 2/2014 | Kono |
| 8,743,637 B2 | 6/2014 | Matsuo |
| 2006/0007763 A1* | 1/2006 | Gelencser .............. G11C 29/44 365/200 |
| 2008/0091988 A1* | 4/2008 | Yoel ....................... G11C 29/24 714/711 |
| 2008/0126876 A1* | 5/2008 | Lee ..................... G06F 11/1016 714/42 |
| 2009/0158087 A1* | 6/2009 | Maeno ................... G11C 29/44 714/6.12 |
| 2010/0157703 A1* | 6/2010 | Fischer ................ G11C 29/027 365/200 |
| 2013/0028035 A1* | 1/2013 | Kono ................... G11C 29/846 365/200 |
| 2013/0051167 A1* | 2/2013 | Iwai .................... G11C 29/702 365/200 |
| 2013/0148451 A1* | 6/2013 | Matsuo ................ G11C 29/848 365/200 |
| 2014/0286113 A1 | 9/2014 | Kubouchi et al. |
| 2015/0135038 A1* | 5/2015 | Wilson .................. G11C 29/76 714/773 |

* cited by examiner

REPAIR INFORMATION PROVIDING DEVICE IN AN INTEGRATED CIRCUIT

CROSS-REFERENCE TO RELATED APPLICATION

This U.S. non-provisional application claims priority under 35 U.S.C. § 119 to Korean Patent Application No. 10-2015-0104097 filed on Jul. 23, 2015, in the Korean Intellectual Property Office (KIPO), the disclosure which is incorporated by reference herein in its entirety.

BACKGROUND

1. Field

Methods and apparatuses consistent with exemplary embodiments relate to semiconductor circuits, more particularly, to repair information providing devices in integrated circuits.

2. Description of the Related Art

An integrated circuit, such as a system-on-chip (SoC), may include a plurality of embedded memory blocks. When a faulty cell is detected during a testing process for testing the embedded memory blocks of the SoC, the faulty cell of the memory block may be replaced with a redundancy cell in the memory block. As a result, the integrated circuit including the memory block having the faulty cell need not be discarded.

Accordingly, even if a memory block includes a faulty cell, the memory block and the integrated circuit may normally operate, thereby increasing a yield of the memory block and the integrated circuit. However, as the number of the memory blocks included in the integrated circuit increases, a size of repair information representing addresses of faulty cells may increase, and thus storage space for the repair information and a loading time necessary to load the repair information may increase.

SUMMARY

Exemplary embodiments provide a repair information providing device capable of reducing a size of storage space necessary to store repair information and reducing a loading time needed to load the repair information.

Exemplary embodiments also provide an integrated circuit including a repair information providing device capable of reducing a size of storage space needed to store repair information and reducing a loading time needed to load the repair information.

According to an aspect of an exemplary embodiment, there is provided a repair information providing device in an integrated circuit including a plurality of memory blocks includes a plurality of faulty cell address registers respectively connected to the memory blocks, a repair information storage block configured to store repair information comprising an address of a faulty cell and a memory index indicating a memory block among the memory blocks having the faulty cell, a repair information control block configured to read the repair information from the repair information storage block, transfer the address of the faulty cell included in the repair information to the plurality of faulty cell address registers, and generate a memory block selection signal based on the memory index included in the repair information, and a clock gating block configured to receive a clock signal, and transfer the clock signal to one of the faulty cell address registers connected to the memory block having the faulty cell in response to receiving the memory block selection signal generated by the repair information control block.

Each of the plurality of faulty cell address registers may include a plurality of flip-flops having reset terminals configured to receive a reset signal.

The faulty cell address registers may be substantially simultaneously reset to an initial value that indicates the faulty cell does not exist in response to the reset signal received at the reset terminals.

The repair information storage block may store, as the repair information, a repair information list having a plurality of rows, each row among the plurality of rows including the address of the faulty cell and the memory index, and the repair information control block may sequentially read the plurality of rows of the repair information list from the repair information storage block.

When the repair information list includes a first row and a second row respectively storing a first address of a first fault cell and a second address of a second fault cell and a same memory index indicating a same memory block, the repair information control block may sequentially read the first row and the second row, when the first row is read, the first address of the first row may be written to one of the faulty cell address registers connected to the same memory block, and when the second row is read, the second address of the second row may be written to the one of the faulty cell address registers at which the first address of the first row is previously written.

The clock gating block may include a demultiplexer having an input terminal configured to receive an enable signal and a plurality of output terminals, the demultiplexer configured to output the enable signal to a selected one of the output terminals in response to the memory block selection signal, and a plurality of logical AND gates, each logical AND gate among the plurality of logical AND gates having a first input terminal connected a corresponding one of the output terminals of the demultiplexer, a second input terminal configured to receive the clock signal, and an output terminal connected to a clock terminal of a corresponding one of the plurality of faulty cell address registers.

Each of the faulty cell address registers may include a plurality of flip-flops connected in series, the plurality of flip-flops configured to sequentially receive bits of the address of the faulty cell from the repair information control block.

Each of the plurality of faulty cell address registers may include a plurality of flip-flops connected in parallel, the plurality of flip-flops configured to substantially simultaneously receive bits of the address of the faulty cell from the repair information control block.

In some example embodiments, the plurality of flip-flops may store the bits of the address of the faulty cell within one clock cycle.

According to an aspect of an exemplary embodiment, there is provided a repair information providing device in an integrated circuit including a plurality of faulty cell address registers respectively connected to the memory blocks, a repair information storage block configured to store repair information comprising an address of a faulty cell and a memory index indicating a memory block among the memory blocks having the faulty cell, a repair information control block configured to read the repair information from the repair information storage block, transfer the address of the faulty cell included in the repair information to the plurality of faulty cell address registers, and generate a memory block selection signal based on the memory index included in the repair information, and a data gating block configured to receive the address of the faulty cell from the repair information control block, and transfer the address of the faulty cell to one of the faulty cell address registers connected to the memory block having the faulty cell in response to receiving the memory block selection signal generated by the repair information control block.

The plurality of faulty cell address registers may be substantially simultaneously reset to an initial value indicating that the faulty cell does not exist in response to receiving a reset signal.

In Each of the plurality of faulty cell address registers may include a plurality of flip-flops connected in parallel, the plurality of flip-flops configured to substantially simultaneously receive bits of the address of the faulty cell from the data gating block.

The plurality of flip-flops may store the bits of the address of the faulty cell within one clock cycle.

The data gating block may include a demultiplexer having an input terminal configured to receive the address of the faulty cell from the repair information control block and a plurality of output terminals, the demultiplexer configured to output the address of the faulty cell to a selected one of the output terminals in response to receiving the memory block selection signal.

Each of the input terminal and the output terminals may have a bit-width greater than or equal to two bits.

As described above, the repair information providing device and the integrated circuit according to exemplary embodiments may store, along with the address of the faulty cell, the memory index indicating the memory block having the faulty cell, and may selectively provide the clock signal (or the address of the faulty cell) to the faulty cell address register connected to the memory block indicated by the memory index among the plurality of the faulty cell address registers. Accordingly, the size of storage space needed to store the repair information may be reduced, and the loading time needed to load the repair information may be reduced.

Further, when the repair information is changed during a memory testing process, the repair information providing device and the integrated circuit according may append updated repair information to the repair information list, and thus the repair information may be reprogrammed.

BRIEF DESCRIPTION OF THE DRAWINGS

Illustrative, non-limiting exemplary embodiments will be more clearly understood from the following detailed description taken in conjunction with the accompanying drawings, in which.

DETAILED DESCRIPTION OF EXEMPLARY EMBODIMENTS

Figure 1:
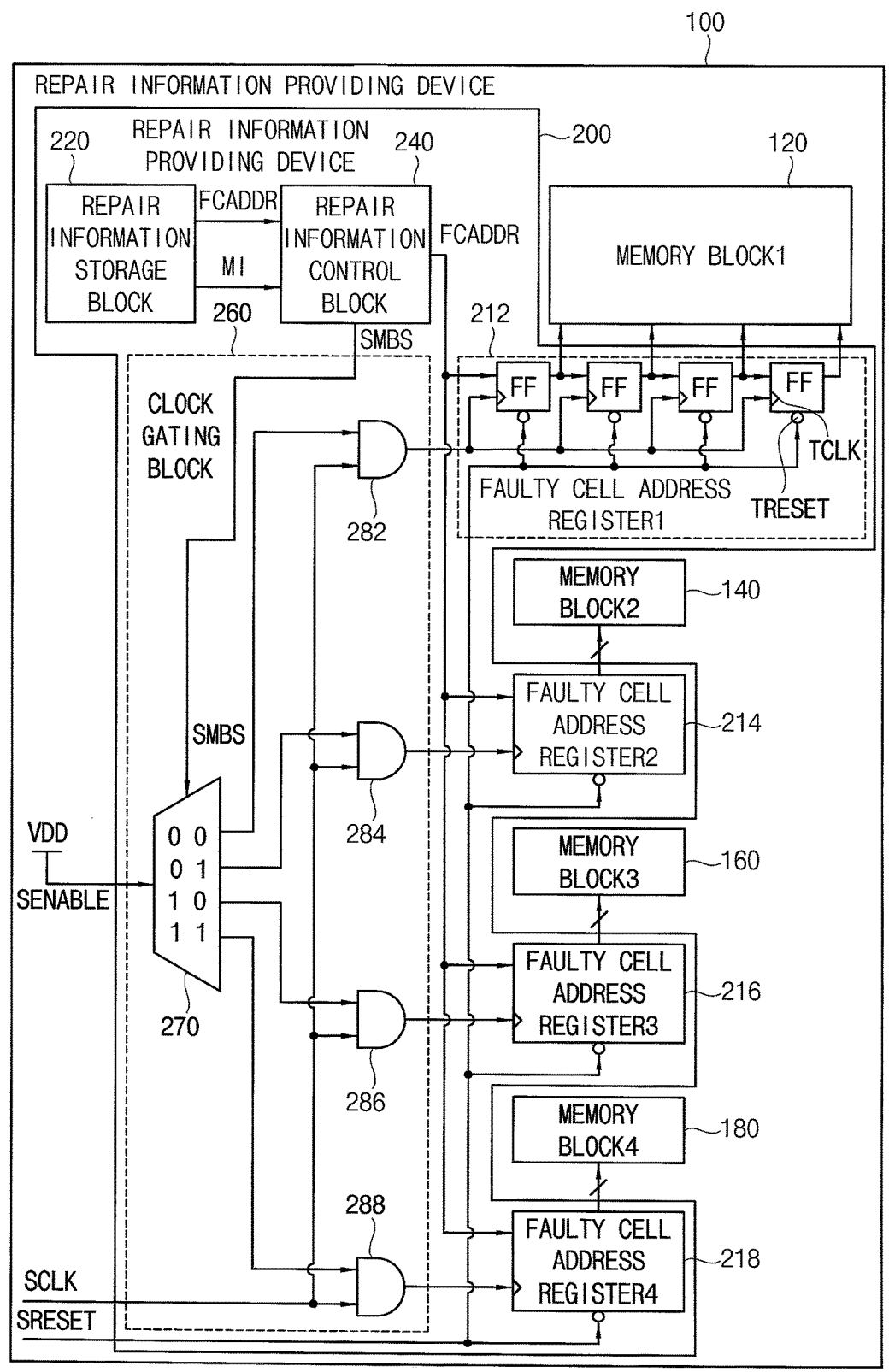
FIG. 1 is a block diagram illustrating an integrated circuit including a repair information providing device according to an exemplary embodiment.

Exemplary embodiments will be described more fully with reference to the accompanying drawings, in which embodiments are shown. The inventive concept of the disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept.

As used herein, the term "and/or" includes any and all combinations of one or more of the associated listed items.

Expressions such as "at least one of," when preceding a list of elements, modify the entire list of elements and do not modify the individual elements of the list.

Also, the terms "unit", "module", etc. mean units for processing at least one function or operation and may be embodied as hardware, software, or a combination thereof.

It will be understood that when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing exemplary embodiments and is not intended to be limiting of the disclosure.

As used herein, the singular forms "a," "an," and "the" are intended to include the plural forms as well, unless the context clearly indicates otherwise.

It will be further understood that the terms "comprises," "comprising," "includes," and/or "including," when used herein, specify the presence of stated features, decimals, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an integrated circuit including a repair information providing device according to an exemplary embodiment.

Referring to FIG. 1, an integrated circuit 100 includes a plurality of memory blocks 120, 140, 160 and 180, and a repair information providing device 200 that provides repair information to the memory blocks 120, 140, 160 and 180. The integrated circuit 100 may be any system-on-chip (SoC) having embedded memory blocks. For example, the integrated circuit 100 may be an application processor (AP), a modem, a ModAP (or an AP having a built-in modem), an ARM core, etc.

Each memory block 120, 140, 160 and 180 may include a plurality of memory cells arranged in a matrix form of a plurality of rows and a plurality of columns. Each memory cell may be a static random access memory (SRAM) cell. Alternatively, each memory cell may be a dynamic random access memory (DRAM) cell or another memory cell.

The memory blocks 120, 140, 160 and 180 may replace a faulty cell with a redundancy cell based on the repair information provided from the repair information providing device 200. This replacement of the faulty cell with the redundancy cell may be referred to as a repair operation. According to an exemplary embodiment, the memory blocks 120, 140, 160 and 180 may perform the repair operation on a column basis, a row basis, a cell basis, or a basis of any set of memory cells. Although FIG. 1 illustrates the integrated circuit 100 including four memory blocks 120, 140, 160 and 180, the integrated circuit 100 may include any number of memory blocks.

The repair information providing device 200 may include a plurality of faulty cell address registers 212, 214, 216 and 218 respectively connected to the memory blocks 120, 140, 160 and 180, a repair information storage block 220 that stores the repair information, a repair information control block 240 that reads the repair information from the repair information storage block 220, and a clock gating block 260 that selectively provides a clock signal SCLK to one of the faulty cell address registers 212, 214, 216 and 218.

An address of a faulty cell in each memory block 120, 140, 160 and 180 may be loaded into a corresponding one of the faulty cell address registers 212, 214, 216 and 218, and each memory block 120, 140, 160 and 180 may perform the repair operation based on the address of the faulty cell loaded into the corresponding one of the faulty cell address registers 212, 214, 216 and 218.

Each faulty cell address register 212, 214, 216 and 218 may include one or more flip-flops FF. Although FIG. 1 illustrates an example in which faulty cell address register 212 includes four flip-flops FF, each faulty cell address register 212, 214, 216 and 218 may include any number of flip-flops FF. Each flip-flop FF may have a clock terminal TCLK for receiving the clock signal SCLK selectively provided by clock gating block 260, and a reset terminal TRESET for receiving a reset signal SRESET. Each flip-flop FF may perform a data storage operation in response to the clock signal SCLK being asserted on the clock terminal TCLK, and may be reset in response to the reset signal SRESET being asserted on the reset terminal TRESET.

In an exemplary embodiment, all flip-flops FF included in the faulty cell address registers 212, 214, 216 and 218 may receive the same reset signal SRESET at the reset terminals TRESET. Thus, all flip-flops FF may be substantially simultaneously reset in response to the reset signal SRESET being asserted at the reset terminals TRESET. For example, the faulty cell address registers 212, 214, 216 and 218 may be reset to an initial value representing that the faulty cell does not exist in response to the reset signal SRESET being asserted at the reset terminals TRESET.

As illustrated in FIG. 1, the flip-flops FF of each faulty cell address register 212, 214, 216 and 218 may be connected in series such that the flip-flops FF sequentially receive bits of the address FCADDR of the faulty cell from the repair information control block 240. That is, an output terminal of a flip-flop FF may be connected to an input terminal of the next flip-flop FF. Thus, the flip-flops FF of each faulty cell address register 212, 214, 216 and 218 may shift and store the bits of the address FCADDR of the faulty cell in response to the clock signal SCLK being asserted on the clock terminal TCLK.

The repair information storage block 220 may store the repair information including the address FCADDR of the faulty cell and a memory index MI indicating a memory block having the faulty cell among the memory blocks 120, 140, 160 and 180. In an exemplary embodiment, the repair information storage block 220 may be a read-only memory (ROM) in which stored data cannot be modified once the data is written. For example, the repair information storage block 220 may be implemented with a laser fuse memory, an electrical fuse memory, a one-time programmable (OTP) memory, etc. The repair information storage block 220 may store the repair information in a form of a list. For example, the repair information storage block 220 may store, as the repair information, a repair information list having a plurality of rows, and each row among the plurality of rows including the address FCADDR of the faulty cell and the memory index MI.

The repair information control block 240 may read the repair information including the address FCADDR of the faulty cell and the memory index MI from the repair information storage block 220. The repair information control block 240 may transfer the address FCADDR of the faulty cell to the respective faulty cell address registers 212, 214, 216 and 218. Further, the repair information control block 240 may generate a memory block selection signal SMBS based on the memory index MI. The repair information control block 240 may sequentially read the plurality of rows of the repair information list from the repair information storage block 220.

The clock gating block 260 may receive the clock signal SCLK from a clock generator included in the integrated circuit 100 or an external device, and may receive the memory block selection signal SMBS from the repair information control block 240. The clock gating block 260 may transfer the clock signal SCLK to a selected one of the faulty cell address registers 212, 214, 216 and 218 in response to assertion of the memory block selection signal SMBS by the repair information control block 240. Thus, the clock gating block 260 may selectively transfer the clock signal SCLK to one of the faulty cell address registers 212, 214, 216 and 218 connected to the memory block having the faulty cell in response to the memory block selection signal SMBS being asserted. In an exemplary embodiment, the clock gating block 260 may include a demultiplexer 270 and a plurality of AND gates 282, 284, 286 and 288.

The demultiplexer 270 may include an input terminal for receiving an enable signal SENABLE, a plurality of output terminals respectively connected to the AND gates 282, 284, 286 and 288, and a selection terminal for receiving the memory block selection signal SMBS. In an exemplary embodiment, the enable signal SENABLE may be a signal having a logic high level. Alternatively, the enable signal SENABLE may be a signal having a logic low level. For example, the demultiplexer 270 may receive a high power supply voltage VDD as the enable signal SENABLE. The demultiplexer 270 may output the enable signal SENABLE to a selected one of the output terminals according to the memory block selection signal SMBS.

Each gate 282, 284, 286 and 288 may have a first input terminal connected a corresponding one of the output terminals of the demultiplexer 270, a second input terminal for receiving the clock signal SCLK, and an output terminal connected to a clock terminal of a corresponding one of the faulty cell address registers 212, 214, 216 and 218. Each gate 282, 284, 286 and 288 may assert an output signal according to the output of the demultiplexer 270 and the clock signal SCLK. Thus, one of the gates 282, 284, 286 and 288 that receives the enable signal SENABLE as the output signal of the demultiplexer 270 may output the clock signal SCLK to the corresponding one of the faulty cell address registers 212, 214, 216 and 218, and the others of the gates 282, 284, 286 and 288 that do not receive the enable signal SENABLE may not output the clock signal SCLK.

The demultiplexer 270 outputs the enable signal SENABLE to the output terminal corresponding to the memory block indicated by the memory block selection signal SMBS, and only one of the AND gates 282, 284, 286 and 288 corresponding to the memory block may output the clock signal SCLK in response to the enable signal SENABLE. Thus, the clock signal SCLK may be provided only to the faulty cell address register connected to the memory block indicated by the memory block selection signal SMBS. Accordingly, although the address FCADDR of the faulty cell is transferred to all faulty cell address registers 212, 214, 216 and 218, only one of the faulty cell address registers 212, 214, 216 and 218 receiving the clock signal SCLK may store the address FCADDR of the faulty cell in response to assertion of the clock signal SCLK, and the others of the faulty cell address registers 212, 214, 216 and 218 may maintain previously stored values.

As described above, the repair information providing device 200 may store the address FCADDR of the faulty cell and the memory index MI indicating the memory block having the faulty cell, and may provide the clock signal SCLK to only the faulty cell address register connected to the memory block having the faulty cell such that only the faulty cell address register receiving the clock signal SCLK stores the address FCADDR of the faulty cell. Although FIG. 1 illustrates an example in which the clock gating block 260 includes the demultiplexer 270 that selectively transfers the enable signal SENABLE and the gates 282, 284, 286 and 288 that perform the logical AND operations on the output signals of the demultiplexer 270 and the clock signal SCLK, the clock gating block 260 may have various other configurations. For example, the clock gating block 260 may not include the gates 282, 284, 286 and 288, and may include only a demultiplexer that receives the clock signal SCLK as an input signal and selectively transfers the clock signal SCLK in response to assertion of the memory block selection signal SMBS.

In a conventional integrated circuit including embedded memory blocks, faulty cell address registers respectively connected to the embedded memory blocks are connected in series. To load faulty cell addresses into the faulty cell address registers, all faulty cell address registers perform data shift operations and data storage operations such that faulty cell addresses are shifted from the first faulty cell address register to the last faulty cell address register. Thus, even if at least one of the embedded memory blocks does not store the faulty cell, the repair information stored in the conventional integrated circuit should include the faulty cell address (e.g., a faulty cell address of which all bits are '0') for the embedded memory block having no faulty cell should be stored, and the repair information for all embedded memory blocks are loaded into all the faulty cell address registers by being shifted.

However, in the integrated circuit 100, the repair information providing device 200 may store, as the repair information, the address FCADDR of the faulty cell and the memory index MI indicating the memory cell having the faulty cell, may substantially simultaneously reset all the faulty cell address registers 212, 214, 216 and 218 to the initial value, and may load the address FCADDR of the faulty cell only into the faulty cell address register connected to the memory cell having the faulty cell based on the memory index MI.

Accordingly, because the repair information only for the memory block having the faulty cell is stored in the integrated circuit 100, a size of storage space for storing the repair information may be reduced, as compared with the conventional integrated circuit that should store the faulty cell addresses for all embedded memory blocks. Moreover, when most of embedded memory cells do not store the faulty cell, the size of storage space for storing the repair information may be greatly reduced by the repair information providing device 200.

Further, after all the faulty cell address registers 212, 214, 216 and 218 are reset to an initial value by assertion of the SRESET signal, the address FCADDR of the faulty cell is loaded into only the faulty cell address register connected to the memory block having the faulty cell in the integrated circuit 100, a loading time for loading the repair information may be reduced, as compared with the conventional integrated circuit in which the faulty cell addresses for all embedded memory blocks are loaded into all the faulty cell address registers by being shifted.

Further, in the conventional integrated circuit, after repair information is written (or programmed) by a memory test (e.g., a wafer-level memory test), when the repair information (or a faulty cell address) for one memory block is changed during a subsequent memory test (e.g., a package-level memory test), the repair information for all memory blocks should be newly written to an additional storage space because a repair information storage block cannot be reprogrammed.

However, in the integrated circuit 100, repair information for a memory block having a faulty cell is written (or programmed) by a memory test (e.g., a wafer-level memory test), when the repair information for the memory block is changed during a subsequent memory test (e.g., a package-level memory test), the updated repair information only for the memory block having the changed faulty cell may be appended to the repair information list. Accordingly, even if the repair information is changed, a size of storage space for the repair information may not be increased. Such appending of only the changed repair information may be referred to as "repair information reprogramming."

As described above, the integrated circuit 100 including the repair information providing device 200 may store the address FCADDR of the faulty cell and the memory index MI indicating the memory block having the faulty cell, and may selectively provide the clock signal SCLK to only one of the faulty cell address registers 212, 214, 216 and 218 connected to the memory block indicated by the memory index MI. Thus, the repair information providing device 200 may store the repair information for only the memory block having the faulty cell, and write the address FCADDR of the faulty cell to only the faulty cell address register connected to the memory block having the faulty cell. Accordingly, in the integrated circuit 100 including the repair information providing device 200, the size of the storage space for storing the repair information may be reduced, and the loading time for loading the repair information may be reduced. Further, in the integrated circuit 100 including the repair information providing device 200, even if the repair information is changed during memory testing processes, the repair information may be reprogrammed by appending the changed repair information to the repair information list.

Hereinafter, an example of a method of writing (or programming) the repair information to the repair information storage block 220 will be described with reference to FIGS. 1 through 3, and an example of an operation of the repair information providing device 200 will be described with reference to FIG. 1, and FIGS. 4 through 5D.

Figure 2:
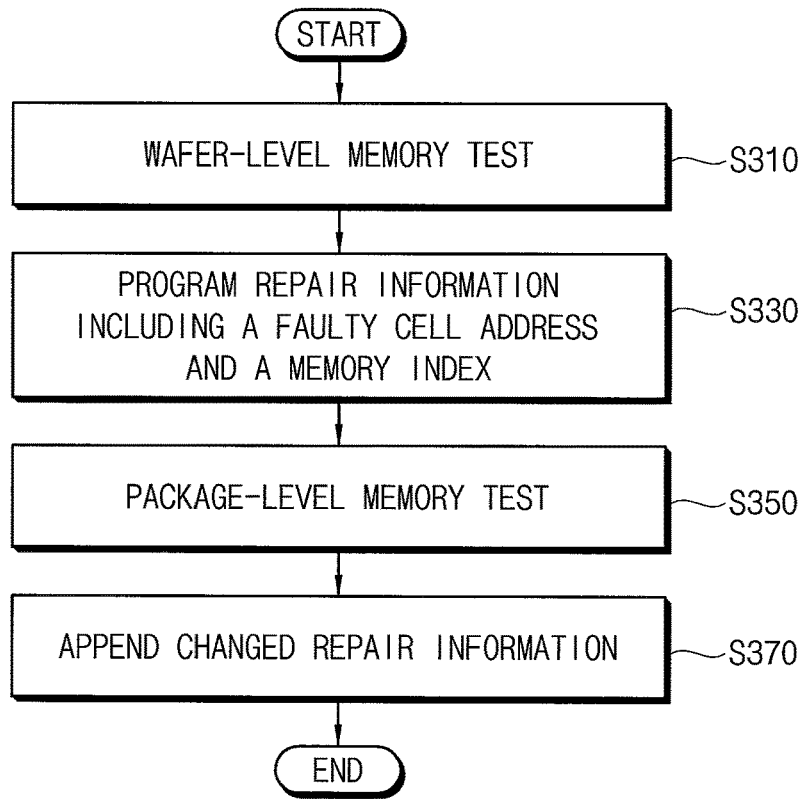
FIG. 2 is a flowchart illustrating a method of writing repair information to a repair information storage block, according to an exemplary embodiment.

FIG. 2 is a flowchart illustrating a method of writing repair information to a repair information storage block. The repair information storage block may be the repair information storage block illustrated in FIG. 1. FIG. 3 is a diagram illustrating an example of a repair information storage block to which repair information is written. The repair information may be written according to writing the repair information illustrated in FIG. 2.

Figure 3:
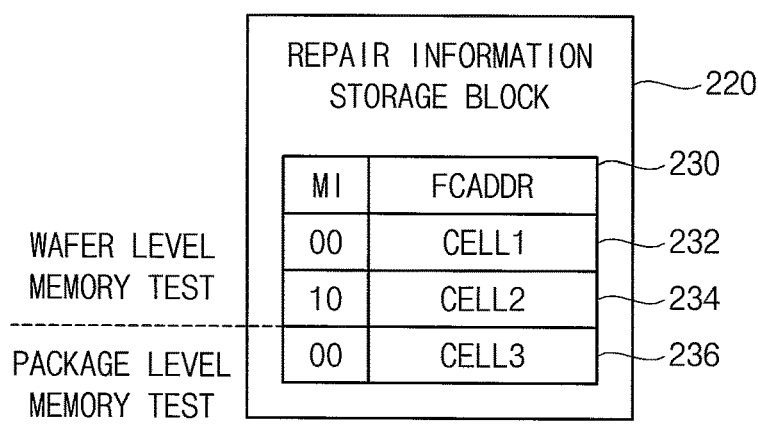
FIG. 3 is a diagram illustrating an example of a repair information storage block to which repair information is written, according to an exemplary embodiment.

Referring to FIGS. 1 through 3, a memory test (i.e., a wafer-level memory test) for memory blocks 120, 140, 160 and 180 included in an integrated circuit 100 may be performed at a wafer-level (S130). For example, the wafer-level memory test may be performed before the integrated circuit 100 is packaged. The wafer-level memory test may be performed by writing predetermined data to each of the memory blocks 120, 140, 160 and 180, by reading stored data from each of the memory blocks 120, 140, 160 and 180, and by comparing the read data with the predetermined data. If faulty cells of the memory blocks 120, 140, 160 and 180 are detected by the wafer-level memory test, repair information including addresses FCADDR of the faulty cells and corresponding memory indexes MI indicating memory blocks having the faulty cells are written (or programmed) to a repair information storage block 220 (S330).

The repair information may be written in a form of a list. For example, as illustrated in FIG. 3, a repair information list 230 having a plurality of rows 232 and 234 may be written to the repair information storage block 220, and each row 232 and 234 may have the address FCADDR of the faulty cell and the memory index MI indicating the memory block having the faulty cell. When, according to the wafer-level memory test, a first memory cell of a first memory block 120 is determined as the faulty cell, and a second memory cell of a third memory block 160 is determined as the faulty cell, the repair information list 230 including a first row 232 having the memory index MI (e.g., '00') indicating the first memory block 120 and an address CELL1 of the first memory cell as the faulty cell address FCADDR, and a second row 234 having the memory index MI (e.g., '10') indicating the third memory block 160 and an address CELL2 of the second memory cell as the faulty cell address FCADDR may be written to the repair information storage block 220.

After the integrated circuit 100 is packaged, another memory test (e.g., a package-level memory test) for the memory blocks 120, 140, 160 and 180 may be further performed (S350). For example, the package-level memory test may be performed after the integrated circuit 100 is packaged, and may be performed by comparing the written data and the read data. When the repair information by the package-level memory test is changed as compared with the repair information by the wafer-level memory test (e.g., when a memory cell of one memory block is incorrectly detected as a faulty cell at the wafer-level memory test, and a faulty cell of the package-level memory test is correctly detected at the package-level memory test, or when a new faulty cell is additionally detected at the package-level memory test), only the changed repair information may be appended to the repair information list 230.

For example, according to the package-level memory test, unlike the wafer-level memory test, when the first memory cell of the first memory block 120 is not determined as the faulty cell, a third memory cell of the first memory block 120 is determined as the faulty cell, and, like the wafer-level memory test, the second memory cell of the third memory block 160 is determined as the faulty cell, the unchanged repair information for the third memory block 160 may not be rewritten, but the changed repair information for the first memory block 120 may be appended to the repair information list 230 generated by the wafer-level memory test. Further, as will be described with reference to FIGS. 4 through 5D, although the address CELL1 of the incorrectly detected first memory cell is written (or loaded) to the first faulty cell address register 212 connected to the first memory block 120, an address CELL3 of the correctly detected third memory cell is overwritten (or reloaded) to the first faulty cell address register 212 when a third row 236 of the repair information list 230 is read, and thus an accurately determined faulty cell address may be loaded into the first faulty cell address register 212.

In a conventional integrated circuit, after repair information is programmed, when the repair information is changed by a subsequent memory test, new repair information for all memory blocks should be programmed to an additional storage space. However, in the integrated circuit 100 including the repair information providing device 200, the repair information for only the memory block having the changed faulty cell address may be appended to a previous repair information list, and thus the an additional storage space may not be required. Thus, the repair information providing device 200 may allow the repair information to be reprogrammed.

Figure 4:
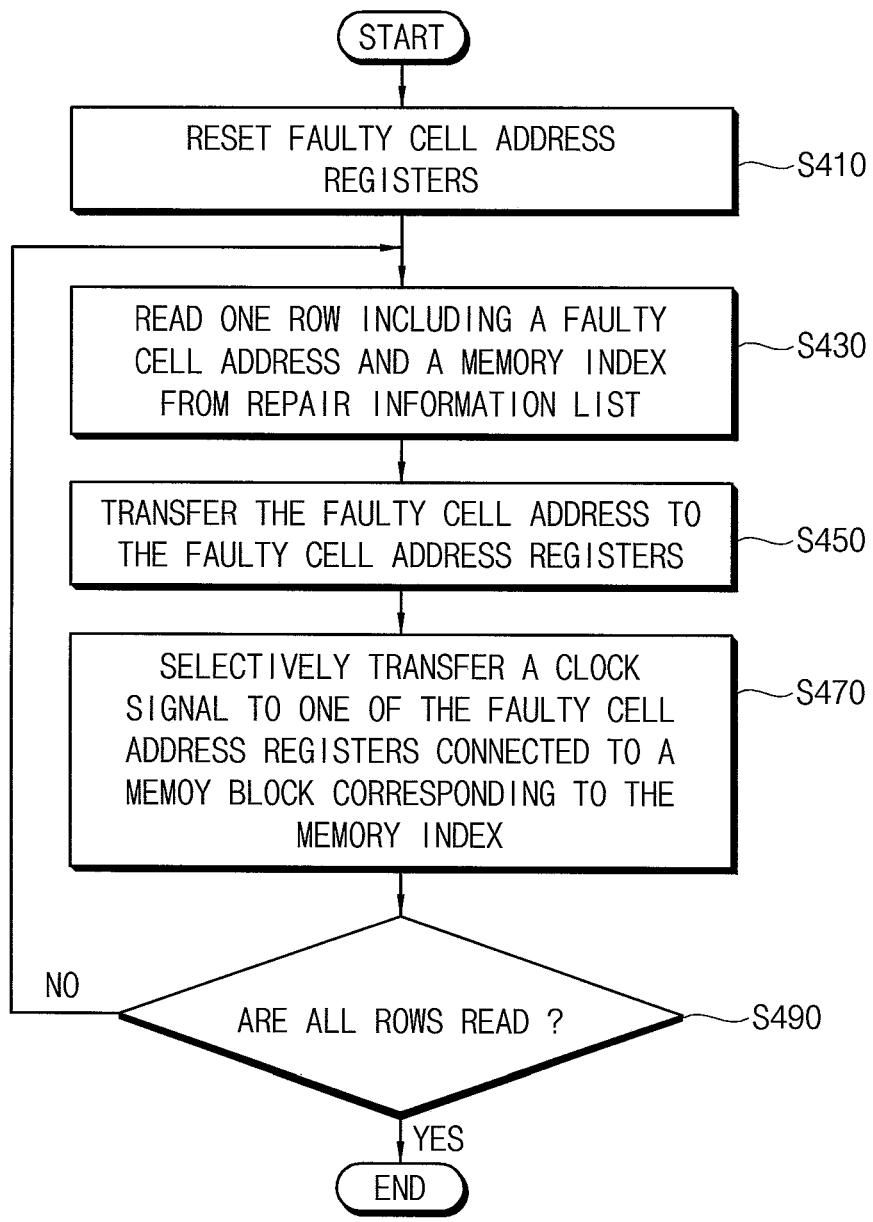
FIG. 4 is a flowchart illustrating a method of providing repair information, according to an exemplary embodiment.

FIG. 4 is a flowchart illustrating a method of providing repair information according to an exemplary embodiment. FIGS. 5A through 5D are diagrams for describing an operation of a repair information providing device that performs a method of providing repair information.

Figure 5A:
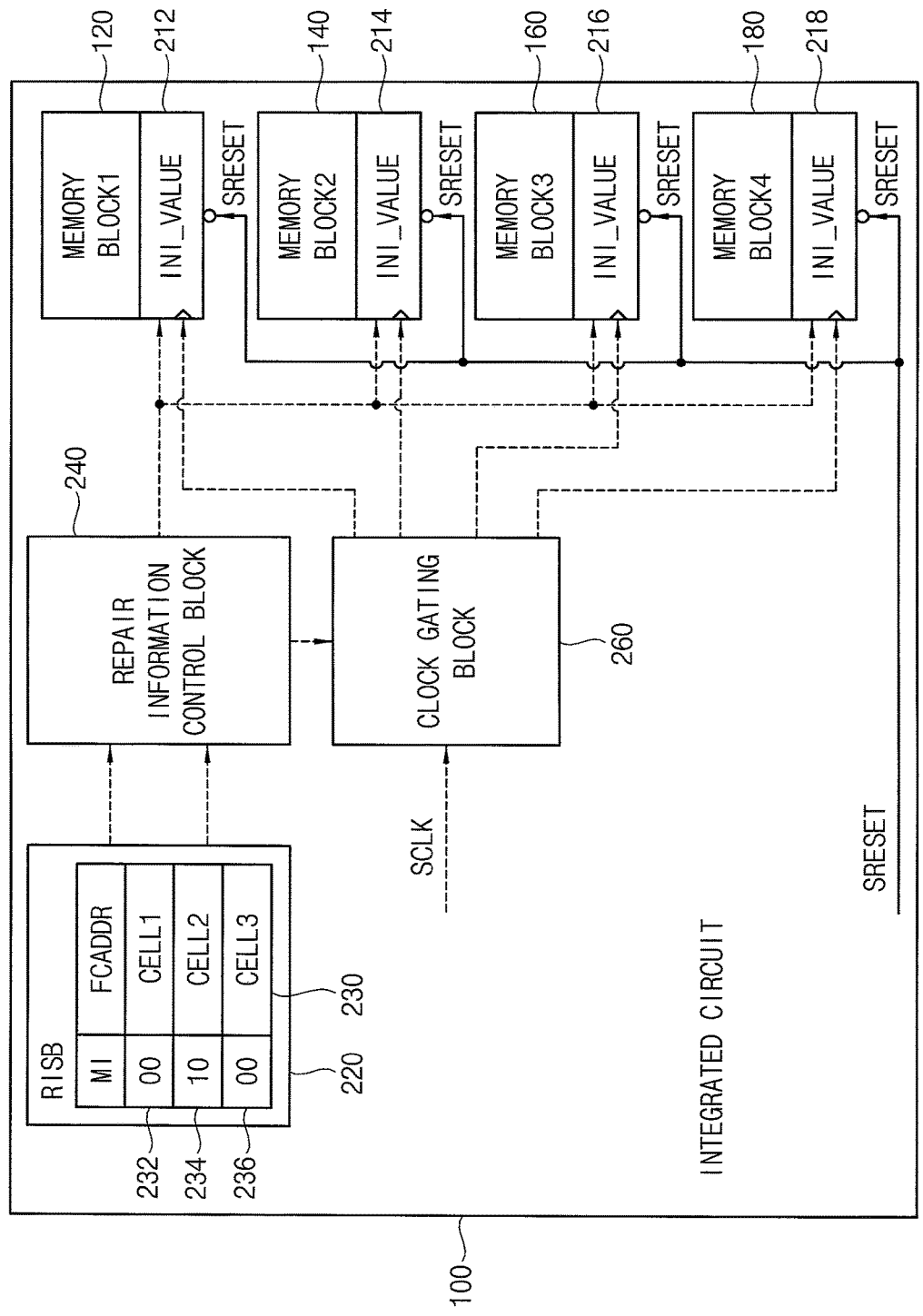
FIGS. 5A through 5D are diagrams for describing an operation of a repair information providing device that performs a method of providing repair information, according to an exemplary embodiment.

Referring to FIGS. 1 and 4, first through fourth faulty cell address registers 212, 214, 216 and 218 respectively connected to first through fourth memory blocks 120, 140, 160 and 180 may be substantially simultaneously reset in response to assertion of a reset signal SRESET (S410). For example, when a power-up sequence for an integrated circuit 100 is performed, a repair information providing device 200 may provide repair information (e.g., an address of a faulty cell) to the memory blocks 120, 140, 160 and 180. Before the repair information is provided to the memory blocks 120, 140, 160 and 180, the faulty cell address registers 212, 214, 216 and 218 may be initially reset. In an exemplary embodiment, as illustrated in FIG. 5A, the first through fourth faulty cell address registers 212, 214, 216 and 218 may be substantially simultaneously reset to an initial value INI_VALUE representing that the faulty cell does not exist in response to assertion of the reset signal SRESET.

Figure 5B:
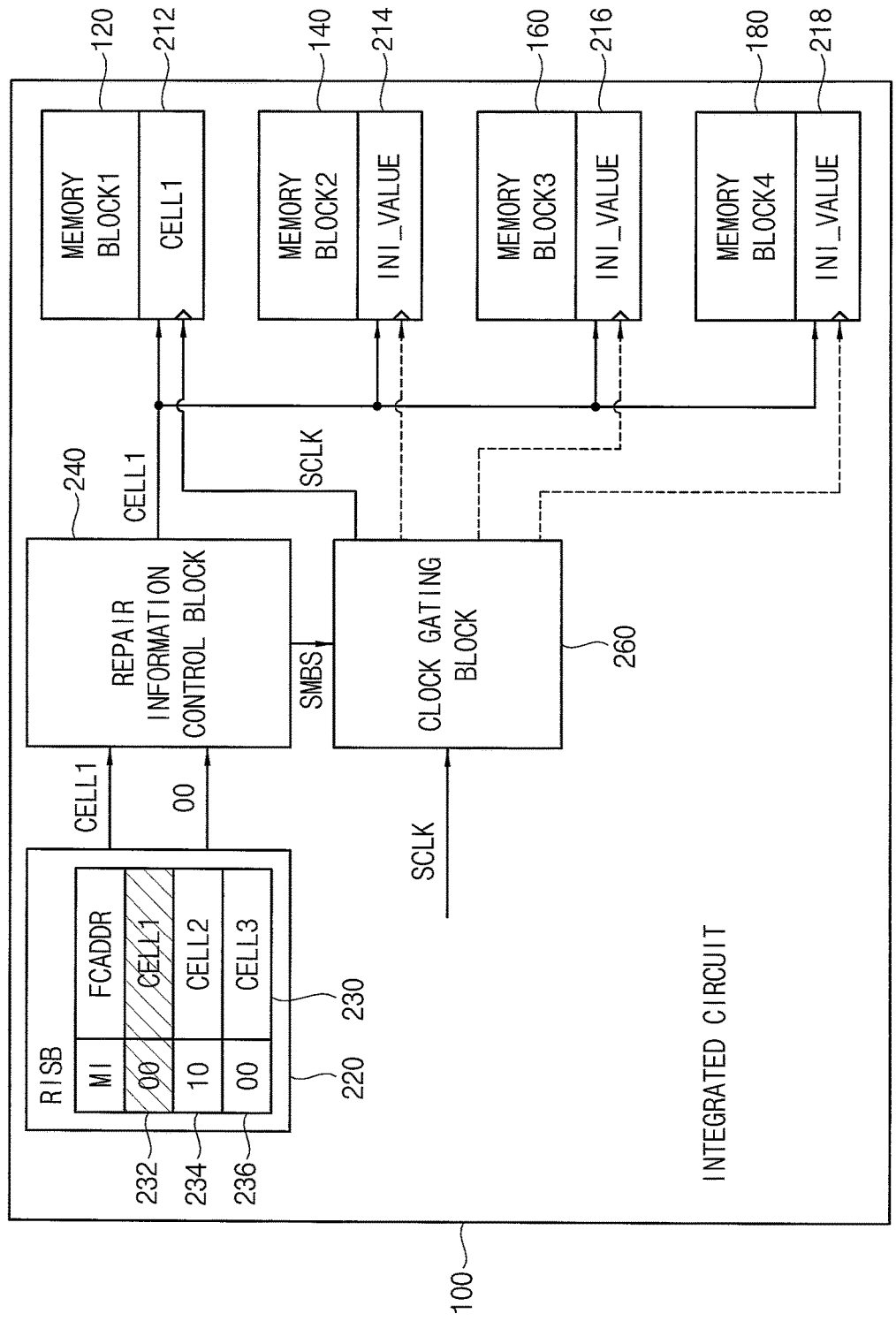

After the faulty cell address registers 212, 214, 216 and 218 are reset, a repair information control block 240 may read one row having an address FCADDR of a faulty cell and a memory index MI from a repair information list 230 of a repair information storage block 220 (S430). In an exemplary embodiment, the repair information control block 240 may sequentially read a plurality of rows of the repair information list 230 from the repair information storage block 220, for example, in an order in which the first written row is first read and the last written row is last read. For example, as illustrated in FIG. 5B, the repair information control block 240 may read a first row 232 from the repair information list 230 of the repair information storage block 220. That is, the repair information control block 240 may read '00' indicating the first memory block 120 as the memory index MI and an address CELL1 of a first memory cell as the address FCADDR of the faulty cell from the repair information storage block 220. When the repair information control block 240 reads the address FCADDR of the faulty cell and the memory index MI, the repair information control block 240 may transfer the address FCADDR of the faulty cell (e.g., the address CELL1 of the first memory cell) to the respective first through fourth faulty cell address registers 212, 214, 216 and 218 (S450). Further, the repair information control block 240 may provide a clock gating block 260 with a memory block selection signal SMBS corresponding to the memory index MI, and the clock gating block 260 may transfer a clock signal SCLK to only a faulty cell address register connected to the memory block corresponding to the memory index MI in response to assertion of the memory block selection signal SMBS. Thus, the repair information providing device 200 may selectively transfer the clock signal SCLK to only the faulty cell address register connected to the memory block indicated by the memory index MI (S470). For example, as illustrated in FIG. 5B, the repair information control block 240 may provide the memory block selection signal SMBS indicating the first memory block 120 to the clock gating block 260 based on the memory index MI of '00' indicating the first memory block 120, and the clock gating block 260 may transfer the clock signal SCLK to only the first faulty cell address register 212 connected to the first memory block 120 in response to assertion of the memory block selection signal SMBS indicating the first memory block 120. Accordingly, the second through fourth faulty cell address registers 214, 216 and 218 that do not receive the clock signal SCLK may maintain the initial value INI_VALUE, and the first faulty cell address register 212 that receives the clock signal SCLK may store the address CELL1 of the first memory cell.

Reading one row of the repair information list 230 (S430), transferring the address FCADDR of the faulty cell to the faulty cell address registers 212, 214, 216 and 218 (S450), and selectively transferring the clock signal SCLK to the faulty cell address register connected to the memory cell block corresponding to the memory index MI (S470) may be repeated until all rows 232, 234 and 236 of the repair information list 230 are read (S490). If all rows 232, 234 and 236 of the repair information list 230 are not read (S490: NO), the next row may be read and the process iteratively repeated until all rows are read.

Figure 5C:
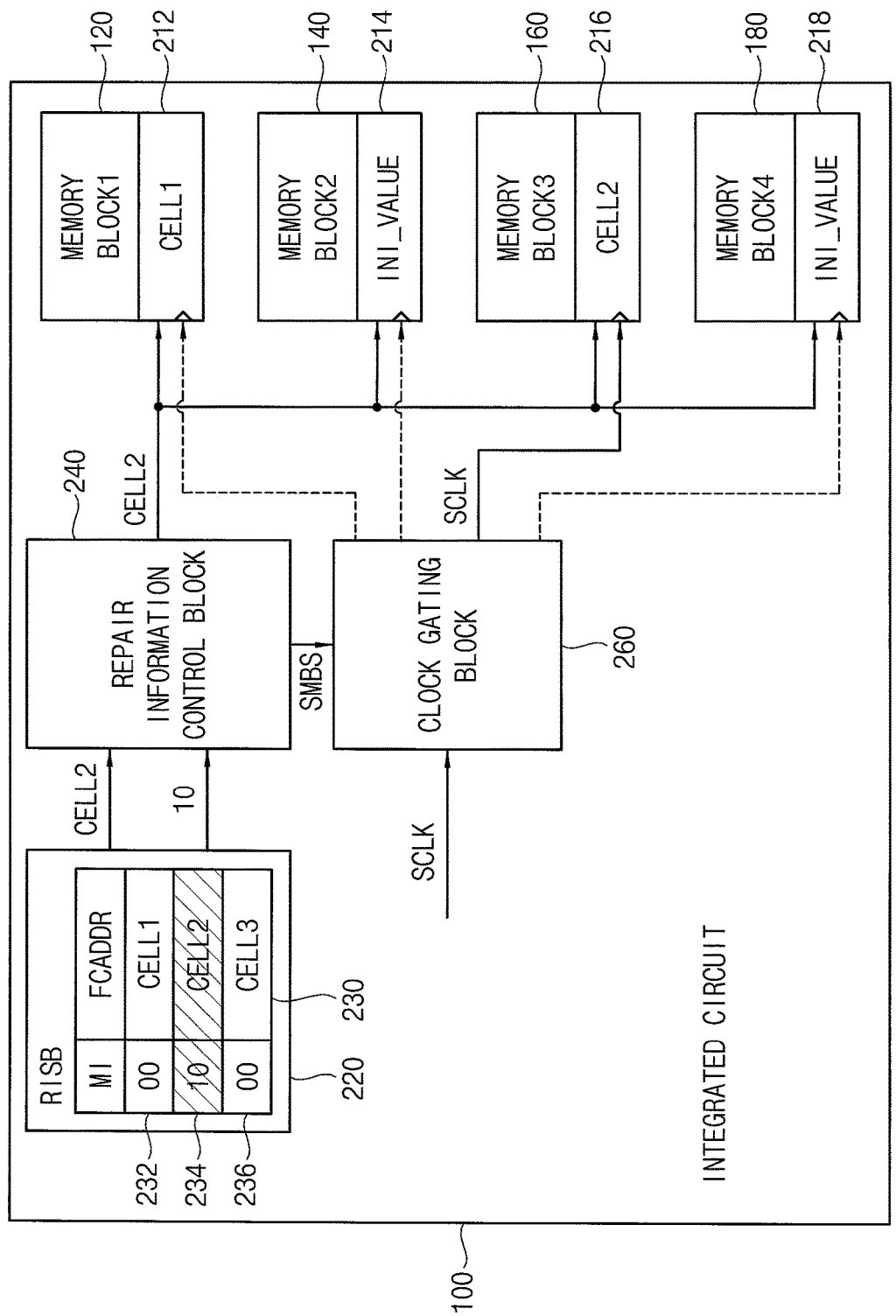

For example, as illustrated in FIG. 5C, after the address CELL1 of the first memory cell is loaded into the first faulty cell address register 212, the repair information control block 240 may read a second row 234 including '10' indicating the third memory block 160 as the memory index MI and an address CELL2 of a second memory cell as the address FCADDR of the faulty cell from the repair information storage block 220. The repair information control block 240 may transfer the address CELL2 of the second memory cell to the respective first through fourth faulty cell address registers 212, 214, 216 and 218, and may provide the memory block selection signal SMBS indicating the third memory block 160 to the clock gating block 260 based on the memory index MI of '10'. The clock gating block 260 may transfer the clock signal SCLK to only the third faulty cell address register 216 connected to the third memory block 160 in response to assertion of the memory block selection signal SMBS. Accordingly, the third faulty cell address register 216 that receives the clock signal SCLK may store the address CELL2 of the second memory cell.

Figure 5D:
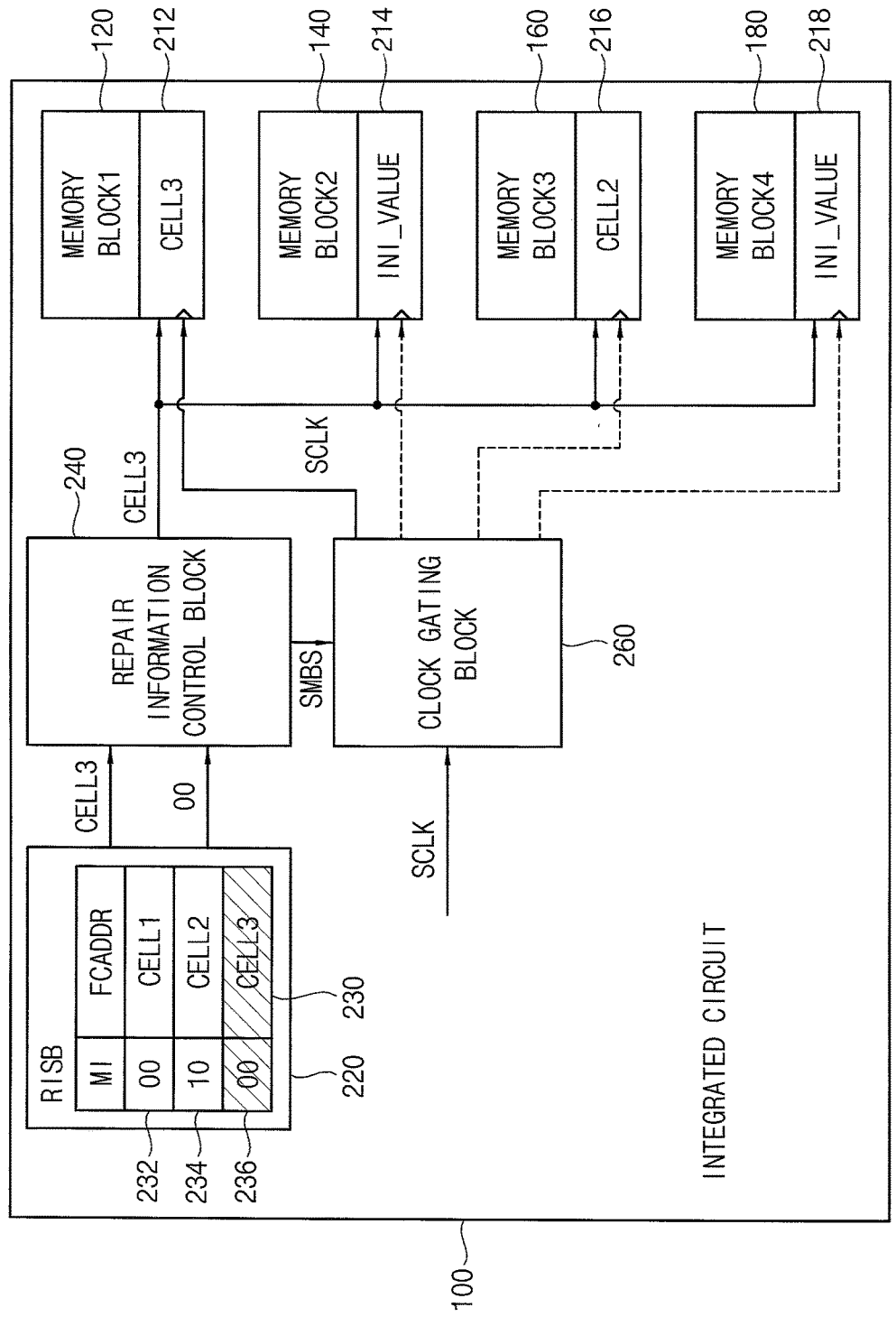

Subsequently, as illustrated in FIG. 5D, after the address CELL2 of the second memory cell is loaded into the third faulty cell address register 216, the repair information control block 240 may read a third row 236 including '00' indicating the first memory block 120 as the memory index MI and an address CELL3 of a third memory cell as the address FCADDR of the faulty cell from the repair information storage block 220. The repair information control block 240 may transfer the address CELL3 of the third memory cell to the respective first through fourth faulty cell address registers 212, 214, 216 and 218, and may provide the memory block selection signal SMBS indicating the first memory block 120 to the clock gating block 260 based on the memory index MI of '00'. The clock gating block 260 may transfer the clock signal SCLK to only the first faulty cell address register 212 connected to the first memory block 120 in response to assertion of the memory block selection signal SMBS. Accordingly, the address CELL3 of the third memory cell may be written to the first faulty cell address register 212, in which the address CELL1 of the first memory cell was previously written, thereby overwriting the address CELL1 of the first memory cell with the new address CELL3 of the third memory cell. Even if a row (e.g., 232) having an incorrectly detected faulty cell address is written (or programmed) to the repair information list 230, the changed (e.g., corrected or added) repair information only for the memory block having the changed (e.g., corrected or added) faulty cell address may be readily added by appending a row (e.g., 236) having a correctly detected faulty cell address to a tail of the repair information list 230, and thus additional storage space for the repair information for all memory blocks is not required.

When all rows 232, 234 and 236 of the repair information list 230 are read (S490: YES), an operation of the repair information providing device 200 is completed. The memory blocks 120, 140, 160 and 180 may perform repair operations based on the address of the faulty cells loaded into the faulty cell address registers 212, 214, 216 and 218.

As described above, the repair information providing device 200 may store the address FCADDR of the faulty cell and the memory index MI indicating the memory block having the faulty cell, and may provide the clock signal SCLK to a selected one of the faulty cell address registers 212, 214, 216 and 218 based on the memory index MI. Thus, only the faulty cell address register connected to the memory block having the faulty cell may store the address FCADDR of the faulty cell. Accordingly, the size of storage space for storing the repair information may be reduced, and the loading time for loading the repair information may be reduced.

Further, in the repair information providing device 200, when the repair information list 230 includes two or more rows 232 and 236 having different faulty cell addresses CELL1 and CELL3 and the same memory index MI (e.g., '00'), the address CELL1 of one row 232 may be written to the faulty cell address register 212, and then the address CELL3 of the other row 236 may be written to the faulty cell address register 212. Accordingly, even if the incorrectly detected faulty cell address CELL1 is written (or programmed) to the repair information storage block 220, other correctly detected faulty cell address CELL2 need not be written to a new storage space, and only the faulty cell address CELL3 replacing the incorrectly detected faulty cell address CELL1 may be rewritten (or reprogrammed) to the repair information storage block 220. That is, the repair information providing device 200 may enable the repair information to be reprogrammed.

Figure 6:
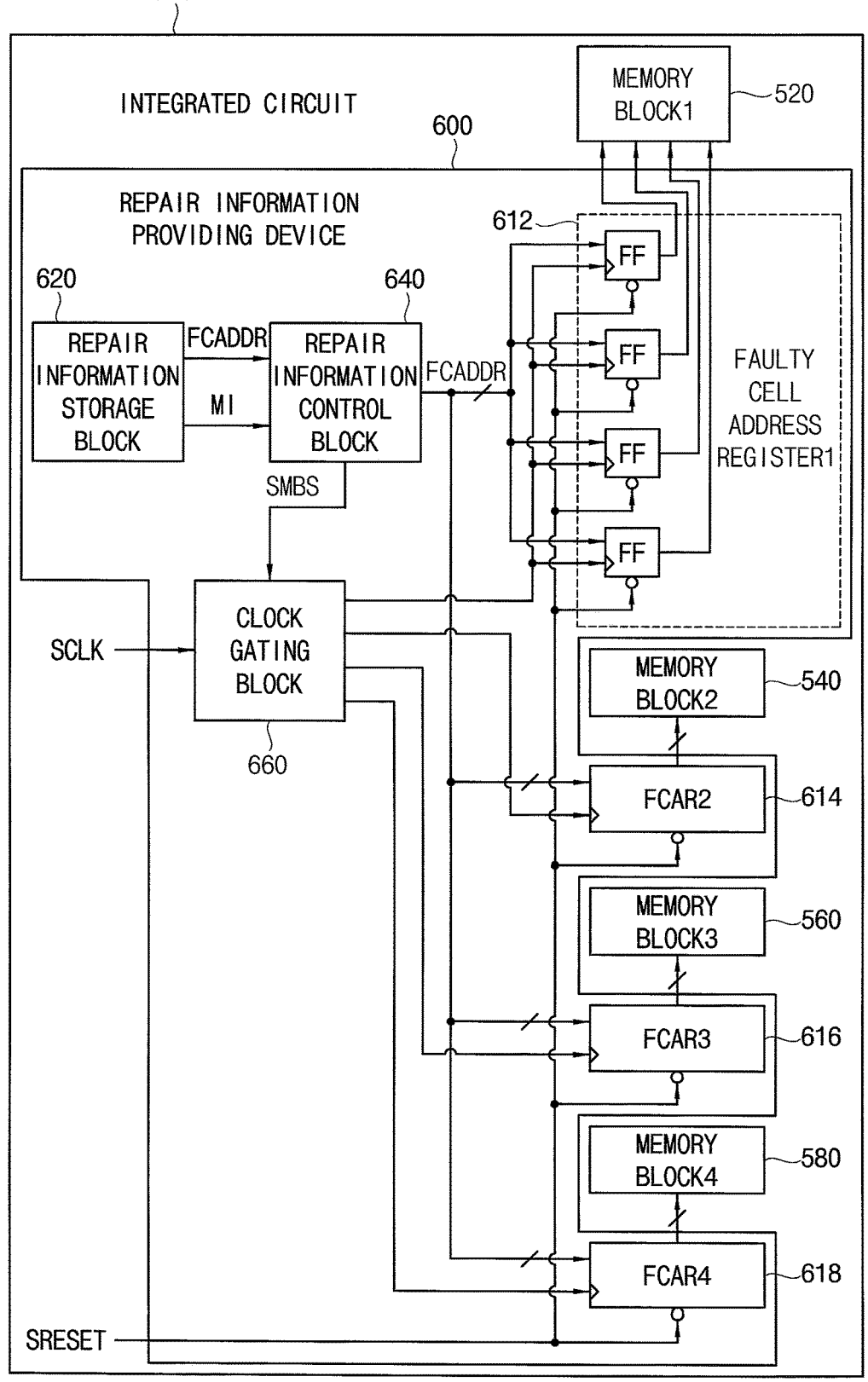
FIG. 6 is a block diagram illustrating an integrated circuit including a repair information providing device, according to an exemplary embodiment.

FIG. 6 is a block diagram illustrating an integrated circuit including a repair information providing device according to an exemplary embodiment.

Referring to FIG. 6, an integrated circuit 500 includes a plurality of memory blocks 520, 540, 560 and 580, and a repair information providing device 600. The repair information providing device 600 may include a plurality of faulty cell address registers 612, 614, 616 and 618, a repair information storage block 620, a repair information control block 640, and a clock gating block 660. The repair information providing device 600 of FIG. 6 may have a configuration similar to the configuration of \repair information providing device 200 of FIG. 1, except that each faulty cell address register 612, 614, 616 and 618 receives bits of an address FCADDR of a faulty cell in parallel from the repair information control block 640.

Each faulty cell address register 612, 614, 616 and 618 may include a plurality of flip-flops FF connected in parallel such that the plurality of flip-flops FF substantially simultaneously receive the bits of the address FCADDR of the faulty cell from the repair information control block 640. For example, input terminals of the plurality of flip-flops FF in each faulty cell address register 612, 614, 616 and 618 may be connected to the repair information control block 640 through different signal lines, and respective bits of the address FCADDR of the faulty cell may be transferred through the different signal lines. Because the bits of the address FCADDR of the faulty cell are transferred in parallel to each faulty cell address register 612, 614, 616 and 618, the respective flip-flops FF may substantially simultaneously store the corresponding bits within one clock cycle. Accordingly, in the repair information providing device 600, each faulty cell address FCADDR may be loaded into the corresponding faulty cell address register 612, 614, 616 and 618 within one clock cycle, and the loading time for loading the repair information may be further reduced.

Figure 7:
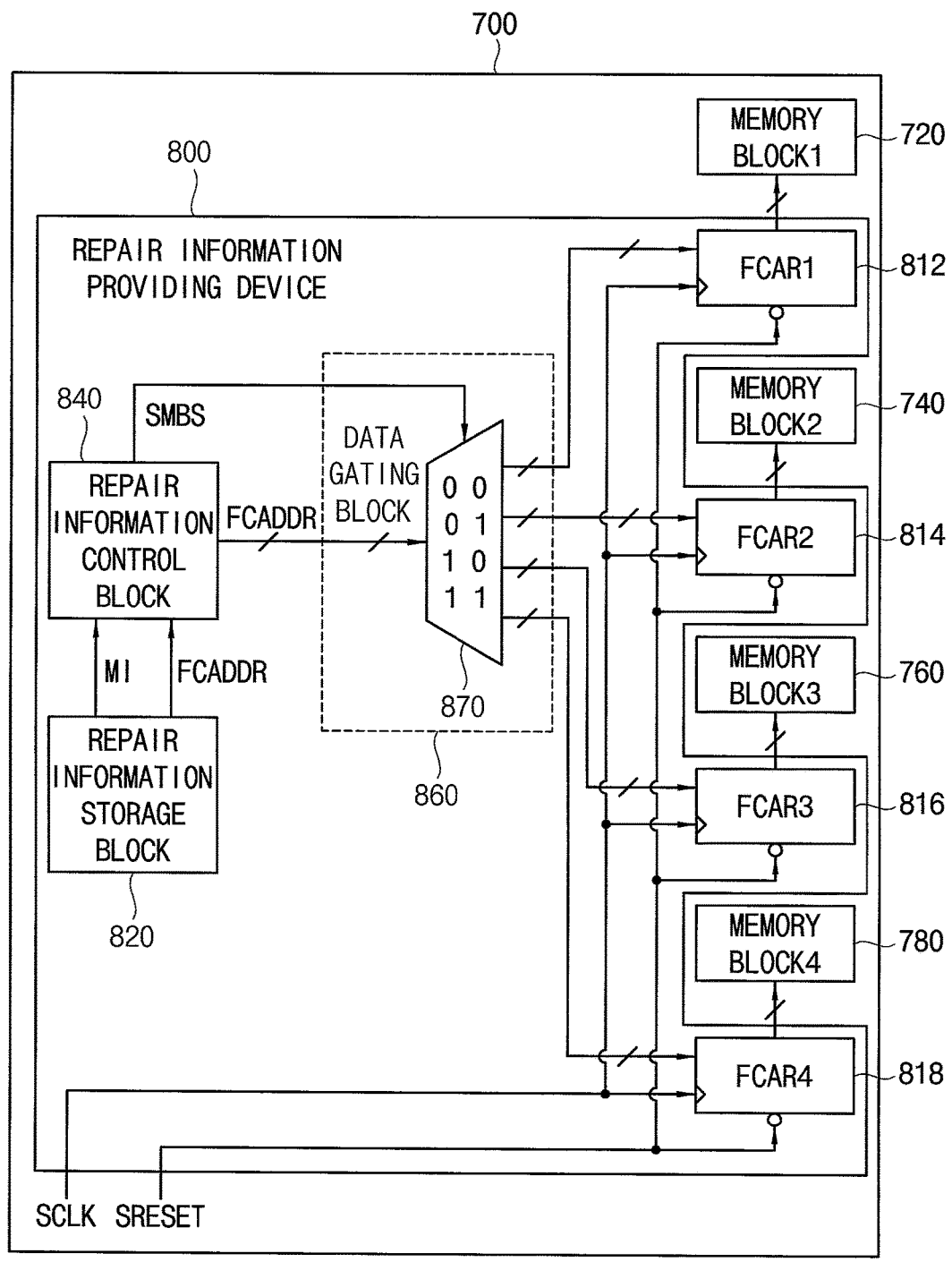
FIG. 7 is a block diagram illustrating an integrated circuit including a repair information providing device, according to an exemplary embodiment.

FIG. 7 is a block diagram illustrating an integrated circuit including a repair information providing device according to an exemplary embodiment.

Referring to FIG. 7, an integrated circuit 700 includes a plurality of memory blocks 720, 740, 760 and 780, and a repair information providing device 800. The repair information providing device 800 may include a plurality of faulty cell address registers 812, 814, 816 and 818, a repair information storage block 820, a repair information control block 840, and a data gating block 860. The repair information providing device 800 of FIG. 7 may have a configuration similar to a configuration of the repair information providing device 200 of FIG. 1, except that the repair information providing device 800 may include the data gating block 860 instead of a clock gating block 260 of FIG. 1.

The repair information control block 840 may read repair information from the repair information storage block 820, generate a memory block selection signal SMBS based on a memory index MI included in the repair information, and provide an address FCADDR of a faulty cell included in the repair information to the data gating block 860. The data gating block 860 may selectively transfer the address FCADDR of the faulty cell to one of the faulty cell address registers 812, 814, 816 and 818 connected to a memory block having the faulty cell based on the memory block selection signal SMBS. In an exemplary embodiment, the data gating block 860 may include a demultiplexer 870 having an input terminal for receiving the address FCADDR of the faulty cell from the repair information control block 840 and a plurality of output terminals respectively connected to the faulty cell address registers 812, 814, 816 and 818. The demultiplexer 870 may output the address FCADDR of the faulty cell to a selected one of the output terminals in response to assertion of the memory block selection signal SMBS.

In an exemplary embodiment, each of the input terminal and the output terminals of the demultiplexer 870 may have a bit-width greater than or equal to two. For example, each of the input terminal and the output terminals may have a bit-width corresponding to the number of the bits of the address FCADDR of the faulty cell. Accordingly, the faulty cell address register connected to the memory block having the faulty cell may receive in parallel the bits of the address FCADDR of the faulty cell. In this case, each faulty cell address register 812, 814, 816 and 818 may include a plurality of flip-flops FF connected in parallel such that the plurality of flip-flops FF substantially simultaneously receive the bits of the address FCADDR of the faulty cell from the data gating block 860. Accordingly, the respective flip-flops FF may substantially simultaneously store the corresponding bits of the address FCADDR of the faulty cell within one clock cycle. That is, each faulty cell address FCADDR may be loaded into the corresponding faulty cell address register 812, 814, 816 and 818 within one clock cycle, and the loading time for loading the repair information may be further reduced.

The exemplary embodiments may be implemented in any integrated circuit having a memory block. For example, the exemplary embodiments may be applied to a system-on-chip (SoC), such as an application processor (AP), a modem, a ModAP (or an AP having a built-in modem), an ARM core, etc.

The foregoing is illustrative of exemplary embodiments and is not to be construed as limiting thereof. Although a few exemplary embodiments have been described, those skilled in the art will readily appreciate that many modifications to the exemplary embodiments are possible without materially departing from the novel teachings and advantages discussed in the present disclosure. Accordingly, all such modifications are intended to be included within the scope of the present disclosure. Therefore, it is to be understood that the foregoing is illustrative of various exemplary embodiments and is not to be construed as limited to the specific exemplary embodiments disclosed, and that modifications to the disclosed exemplary embodiments, as well as other embodiments, are intended to be included within the scope of the disclosure.

What is claimed is:

1. A repair information providing device in an integrated circuit comprising a plurality of memory blocks, the repair information providing device comprising:
   a plurality of faulty cell address registers respectively connected to the memory blocks;
   a repair information storage block configured to store repair information comprising an address of a faulty cell and a memory index indicating a memory block among the memory blocks having the faulty cell;

a repair information control block configured to read the repair information from the repair information storage block, transfer the address of the faulty cell included in the repair information to the plurality of faulty cell address registers, and generate a memory block selection signal based on the memory index included in the repair information; and a clock gating block configured to receive a clock signal, and transfer the clock signal to one of the faulty cell address registers connected to the memory block having the faulty cell in response to receiving the memory block selection signal generated by the repair information control block, wherein each of the plurality of faulty cell address registers comprises a plurality of flip-flops, the plurality of flip-flops comprising reset terminals configured to receive a reset signal, and wherein the plurality of faulty cell address registers are substantially simultaneously reset to an initial value that indicates the faulty cell does not exist in response to the reset signal received at the reset terminals.

2. The repair information providing device of claim 1, wherein the repair information storage block is further configured to store, as the repair information, a repair information list comprising a plurality of rows, each row among the plurality of rows comprising the address of the faulty cell and the memory index, and wherein the repair information control block is further configured to sequentially read the plurality of rows of the repair information list from the repair information storage block.

3. The repair information providing device of claim 2, wherein, the repair information list comprises a first row and a second row respectively storing a first address of a first fault cell and a second address of a second fault cell and a same memory index indicating a same memory block, the repair information control block is further configured to sequentially read the first row and the second row, when the first row is read, the first address of the first row is written to one of the faulty cell address registers connected to the same memory block, and when the second row is read, the second address of the second row is written to the one of the faulty cell address registers at which the first address of the first row is previously written.

4. The repair information providing device of claim 1, wherein the clock gating block comprises:

a demultiplexer comprising an input terminal configured to receive an enable signal and a plurality of output terminals, the demultiplexer configured to output the enable signal to a selected one of the output terminals in response to receiving the memory block selection signal; and a plurality of logical AND gates, each logical AND gate among the plurality of logical AND gates comprising a first input terminal connected a corresponding one of the output terminals of the demultiplexer, a second input terminal configured to receive the clock signal, and an output terminal connected to a clock terminal of a corresponding one of the plurality of faulty cell address registers.

5. The repair information providing device of claim 1, wherein the plurality of flip-flops are connected in series, and are configured to sequentially receive bits of the address of the faulty cell from the repair information control block.

6. The repair information providing device of claim 1, wherein the plurality of flip-flops are connected in parallel, and are configured to substantially simultaneously receive bits of the address of the faulty cell from the repair information control block.

7. The repair information providing device of claim 6, wherein the plurality of flip-flops store the bits of the address of the faulty cell within one clock cycle.

8. A repair information providing device in an integrated circuit comprising a plurality of memory blocks, the repair information providing device comprising: a plurality of faulty cell address registers respectively connected to the memory blocks; a repair information storage block configured to store repair information comprising an address of a faulty cell and a memory index indicating a memory block among the memory blocks having the faulty cell;

a repair information control block configured to read the repair information from the repair information storage block, transfer the address of the faulty cell included in the repair information to the plurality of faulty cell address registers, and generate a memory block selection signal based on the memory index included in the repair information; and a data gating block configured to receive the address of the faulty cell from the repair information control block, and transfer the address of the faulty cell to one of the faulty cell address registers connected to the memory block having the faulty cell in response to receiving the memory block selection signal generated by the repair information control block, wherein each of the plurality of faulty cell address registers comprises a plurality of flip-flops, the plurality of flip-flops comprising reset terminals configured to receive a reset signal, and wherein the plurality of faulty cell address registers are substantially simultaneously reset to an initial value indicating that the faulty cell does not exist in response to receiving the reset signal.

9. The repair information providing device of claim 8, wherein each of the plurality of faulty cell address registers comprises:

a plurality of flip-flops connected in parallel, the plurality of flip-flops configured to substantially simultaneously receive bits of the address of the faulty cell from the data gating block.

10. The repair information providing device of claim 9, wherein the plurality of flip-flops store the bits of the address of the faulty cell within one clock cycle.

11. The repair information providing device of claim 8, wherein the data gating block includes:

a demultiplexer comprising an input terminal configured to receive the address of the faulty cell from the repair information control block and a plurality of output terminals, the demultiplexer configured to output the address of the faulty cell to a selected one of the output terminals in response to receiving the memory block selection signal.

12. The repair information providing device of claim 11, wherein each of the input terminal and the output terminals has a bit-width greater than or equal to two bits.

13. An integrated circuit comprising:

a plurality of memory blocks;

a plurality of faulty cell address registers configured to store a memory cell address, each of the plurality of faulty cell address registers respectively connected to a corresponding memory block among the plurality of memory blocks;

a repair information storage block configured to store a faulty memory cell address of a faulty memory cell and a memory index indicating a memory block among the plurality of memory blocks in which the faulty memory cell is located; and a repair information control block configured to read the faulty memory cell address and the memory index from the repair information storage block, wherein the integrated circuit is configured to selectively assert the faulty memory cell address read by the repair information control block from the repair information storage block to a faulty cell address register among the plurality of faulty cell address registers corresponding to a memory block among the plurality memory blocks indicated by the memory index, and wherein each of the plurality of faulty cell address registers comprises a plurality of flip-flops, the plurality of flip-flops comprising reset terminals configured to receive a reset signal, and wherein the plurality of faulty cell address registers are substantially simultaneously reset to an initial value that indicates the faulty cell does not exist in response to the reset signal received at the reset terminals.

14. The integrated circuit of claim 13, wherein the memory block among the plurality memory blocks indicated by the memory index is configured to read faulty memory cell address from the corresponding faulty cell address register to which the faulty memory cell address is asserted and perform a repair operation of replacing the faulty memory cell in the memory block with a redundancy cell in the memory block.

15. The integrated circuit of claim 14, wherein the integrated circuit is further configured to selectively assert the faulty memory cell address to the faulty cell address register among the plurality of faulty cell address registers corresponding to the memory block among the plurality memory blocks indicated by the memory index based on a clock signal.

16. The integrated circuit of claim 15, wherein the integrated circuit further comprises:

a clock gating block configured to receive the clock signal and the faulty memory cell address read by the repair information control block from the repair information storage block, and selectively assert the faulty memory cell address read by the repair information control block from the repair information storage block to the faulty cell address register among the plurality of faulty cell address registers corresponding to the memory block among the plurality memory blocks indicated by the memory index based on the clock signal.

17. The integrated circuit of claim 15, wherein the integrated circuit further comprises:

a data gating block configured to receive the faulty memory cell address read by the repair information control block from the repair information storage block, and selectively assert the faulty memory cell address read by the repair information control block from the repair information storage block to the memory block among the plurality memory blocks indicated by the memory index, wherein the clock signal is asserted to the plurality of faulty cell address registers, and wherein the faulty cell address register among the plurality of faulty cell address registers corresponding to the memory block among the plurality memory blocks indicated by the memory index stores the faulty memory cell address therein according to the clock signal.

* * * * *